US010619607B2

(12) United States Patent
Bringhurst

(10) Patent No.: US 10,619,607 B2
(45) Date of Patent: Apr. 14, 2020

(54) AIR BOX ASSEMBLY FOR AN OUTDOOR POWER TOOL

(71) Applicant: MTD PRODUCTS INC, Valley City, OH (US)

(72) Inventor: Cory Bringhurst, Valley City, OH (US)

(73) Assignee: MTD PRODUCTS INC, Valley City, OH (US)

(*) Notice: Subject to any disclaimer, the term of this patent is extended or adjusted under 35 U.S.C. 154(b) by 139 days.

(21) Appl. No.: 15/709,650

(22) Filed: Sep. 20, 2017

(65) Prior Publication Data

US 2018/0080419 A1 Mar. 22, 2018

Related U.S. Application Data

(60) Provisional application No. 62/396,964, filed on Sep. 20, 2016.

(51) Int. Cl.
*F02B 63/02* (2006.01)
*F02M 35/12* (2006.01)
(Continued)

(52) U.S. Cl.
CPC ......... *F02M 35/12* (2013.01); *B01D 46/0005* (2013.01); *B01D 46/0041* (2013.01);
(Continued)

(58) Field of Classification Search
CPC ....... F02B 61/045; F02B 63/02; F02M 35/10; F02M 35/167; F02M 35/10262; F02M 35/12; F02M 35/0216; F02M 35/1017; F02M 35/04; F02M 35/14; F02M 35/024; F02M 35/0201; B01D 46/0005;
(Continued)

(56) References Cited

U.S. PATENT DOCUMENTS 5,062,875 A 11/1991 Nagashima
5,377,632 A * 1/1995 Aronsson ................ B24B 27/08
123/198 E (Continued)

FOREIGN PATENT DOCUMENTS

JP 2000-087815 A 3/2000

OTHER PUBLICATIONS

International Search Report and Written Opinion for International Application No. PCT/US2017/052387 dated Nov. 17, 2017.

*Primary Examiner* — Minh Chau T Pham
(74) *Attorney, Agent, or Firm* — Wegman Hessler

(57) ABSTRACT

An air box assembly attached to an outdoor power tool for reducing sound generated by an engine is provided. The air box assembly includes a casing formed as an upper and lower housing attached to each other to define an enclosed space. The casing includes at least one air inlet and an air outlet. At least one filter is positioned within the casing. An air guide assembly is positioned within the casing such that the flow of air to the engine passes through the air guide assembly as it travels to the engine and sound from the engine passes through the air guide assembly as it exits the air box assembly. The air guide assembly includes a plurality of fluid pathways therein, wherein the fluid pathways are in fluid communication with the air outlet of the air box assembly.

17 Claims, 17 Drawing Sheets

(51) Int. Cl.
   *F02M 35/04* (2006.01)
   *F02M 35/14* (2006.01)
   *F02M 35/024* (2006.01)
   *F02M 35/02* (2006.01)
   B01D 46/00 (2006.01)
   *F02M 35/10* (2006.01)
   *B01D 46/42* (2006.01)

(52) U.S. Cl.
   CPC ...... *F02M 35/0201* (2013.01); *F02M 35/024* (2013.01); *F02M 35/0216* (2013.01); *F02M 35/04* (2013.01); *F02M 35/1017* (2013.01); *F02M 35/14* (2013.01); *B01D 46/4236* (2013.01); *B01D 2275/10* (2013.01); *B01D 2279/60* (2013.01); *F02B 63/02* (2013.01)

(58) Field of Classification Search
   CPC ............ B01D 46/0041; B01D 2275/10; B01D 46/4236; B01D 2279/60
   USPC .......... 55/385.3, DIG. 28, DIG. 30; 96/380–388; 123/184.57, 572, 573, 123/198 E, 195 P, 195 C
   See application file for complete search history.

(56) References Cited

U.S. PATENT DOCUMENTS

| | | | |
|---|---|---|---|
| 5,438,965 A * | 8/1995 | Aronsson | B27B 17/00 123/198 E |
| 5,722,357 A | 3/1998 | Choi | |
| 5,908,337 A | 6/1999 | Mashiko | |
| 5,996,734 A | 12/1999 | Lam et al. | |
| 6,047,677 A | 4/2000 | Kim | |
| 6,206,135 B1 | 3/2001 | Kim et al. | |
| 6,609,489 B1 | 8/2003 | Slopsema et al. | |
| 6,655,338 B2 * | 12/2003 | Tsubouchi | F02B 61/045 123/184.57 |
| 6,705,272 B2 | 3/2004 | Leipelt et al. | |
| 6,796,859 B1 | 9/2004 | Justen et al. | |
| 6,804,360 B1 * | 10/2004 | Misawa | F02M 35/1227 381/71.1 |
| 6,805,088 B2 | 10/2004 | Tachibana et al. | |
| 6,840,205 B2 | 1/2005 | Sato et al. | |
| 6,938,727 B2 | 9/2005 | Xia | |
| 6,959,934 B2 | 11/2005 | Rioux et al. | |
| 7,201,129 B2 | 4/2007 | Ohba et al. | |
| 7,246,593 B2 | 7/2007 | Murphy | |
| 7,290,519 B2 | 11/2007 | Ohba et al. | |
| 7,614,380 B2 | 11/2009 | Tsutsui et al. | |
| 7,712,577 B2 | 5/2010 | Koss | |
| 7,802,651 B2 | 9/2010 | Park et al. | |
| 7,845,623 B2 | 12/2010 | Dopke et al. | |
| 7,938,225 B2 | 5/2011 | Cardno | |
| 8,851,945 B2 * | 10/2014 | Harada | F02B 61/045 440/77 |
| 8,900,356 B2 | 12/2014 | Bouhanna | |
| 9,194,293 B2 | 11/2015 | Napier | |
| 9,194,342 B2 * | 11/2015 | Volckart | F02M 35/1017 |
| 2003/0160472 A1 | 8/2003 | Xia et al. | |
| 2005/0189167 A1 | 9/2005 | Bozzi | |
| 2005/0217635 A1 | 10/2005 | Vogel | |
| 2005/0221739 A1 * | 10/2005 | Hoffmann | B24B 23/00 451/357 |
| 2008/0148512 A1 * | 6/2008 | Beskow | A47L 9/04 15/350 |
| 2009/0188217 A1 | 7/2009 | Amann | |
| 2013/0239911 A1 * | 9/2013 | Ichihashi | F01P 1/00 123/41.7 |
| 2014/0271132 A1 | 9/2014 | Le Roy et al. | |
| 2019/0223669 A1 * | 7/2019 | Lauer | B23Q 11/0046 |

\* cited by examiner

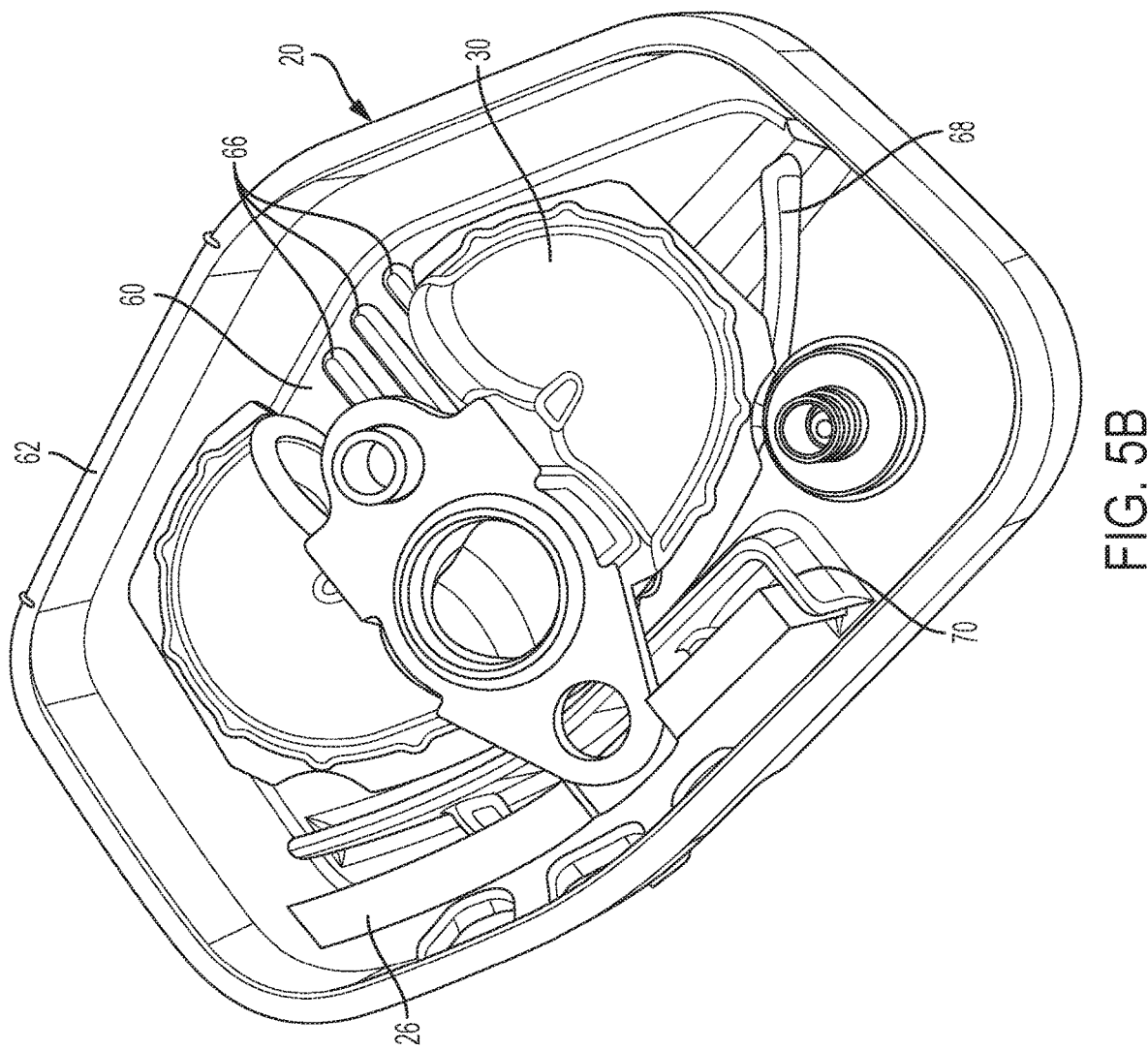

AIR BOX ASSEMBLY FOR AN OUTDOOR POWER TOOL

CROSS-REFERENCE TO RELATED APPLICATIONS

This application claims priority to U.S. Provisional Patent Application Ser. No. 62/396,964 filed Sep. 20, 2016, and entitled AIR BOX ASSEMBLY FOR AN OUTDOOR POWER TOOL, which is herein incorporated by reference in its entirety.

FIELD OF THE INVENTION

The present invention relates to outdoor power equipment, and more particularly, the present invention relates to lawn maintenance tools having an engine with an air box configured to reduce noise produced by the engine during operation.

BACKGROUND OF THE INVENTION

Many lawn maintenance tools—such as chainsaws, string trimmers, hedge trimmers, blowers, tillers, and the like—include an internal combustion engine as the primary power source for powering the tool. These engines can be single-cylinder, two-cylinder, or even 4-cylinder engines, and these engines can often generate noise levels that are unsafe for the user as well as disruptive to the surrounding communities during use. Landscapers as well as homeowner-users will often wear soundproof or sound-dampening headphones or other ear protection to counteract the noise generated by the engines of the tools.

These lawn maintenance tools also sometimes include an air filter or an air box having a filter located therein, wherein the air filter or air box includes an air filter. However, when these air filters/air boxes are used on small engines, these engines can produce fuel backflow, or "spit back," wherein unburned fuel that is introduced into the combustion cylinder of the engine travels upstream through the carburetor and into the air filter or air box. This unburned fuel can pool within the air box if it does not flow back into the combustion chamber during the downstroke of the piston, which generates a "sucking" of air through the carburetor.

BRIEF SUMMARY OF THE INVENTION

In one aspect of the present invention, an air box assembly attached to an engine of an outdoor power tool is provided. The power tool includes a carburetor for providing an air-fuel mixture to the engine. The air box assembly is positioned upstream from the carburetor. The air box assembly includes a casing formed of an upper housing and a lower housing connected to each other. The casing has at least one air inlet and an air outlet formed therein. The casing further includes at least one filter positioned within the casing. An air guide assembly is positioned within the casing and attached to one of the upper or lower housings. The air guide assembly has a pair of opposing openings, an exit aperture, and a plurality of fluid pathways connecting the openings and the exit aperture, wherein the exit aperture is fluidly connected to the air outlet of the casing. Ambient air enters the casing through the at least one air inlet and travels through the openings and the fluid pathways of said the guide assembly. The air exits the air guide assembly through the exit aperture before exiting the casing through the air outlet.

In another aspect of the present invention, an air box assembly attached to an engine of an outdoor power tool is provided. The power tool includes a carburetor for providing an air-fuel mixture to the engine. The air box assembly is positioned upstream from the carburetor. The air box assembly includes a casing formed of an upper housing and a lower housing connected to each other. The casing has at least one air inlet and an air outlet formed therein. A media filter is positioned adjacent to the at least one air inlet. A sound filter is positioned adjacent to the outlet. An air guide assembly is positioned within the casing and attached to one of the upper or lower housings. The air guide assembly has a pair of opposing openings, an exit aperture, and a pair of opposing fluid pathways, wherein each fluid pathway extends between one of the openings and the exit aperture. The exit aperture is fluidly connected to the air outlet of the casing. Ambient air enters the casing through the at least one air inlet and travels through the openings and flows through said fluid pathways of the air guide assembly. The air exits said air guide assembly through the exit aperture before exiting the casing through the air outlet Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which:

FIG. 5B is a bottom perspective view of the air box assembly without the lower housing.

Figure 1A:
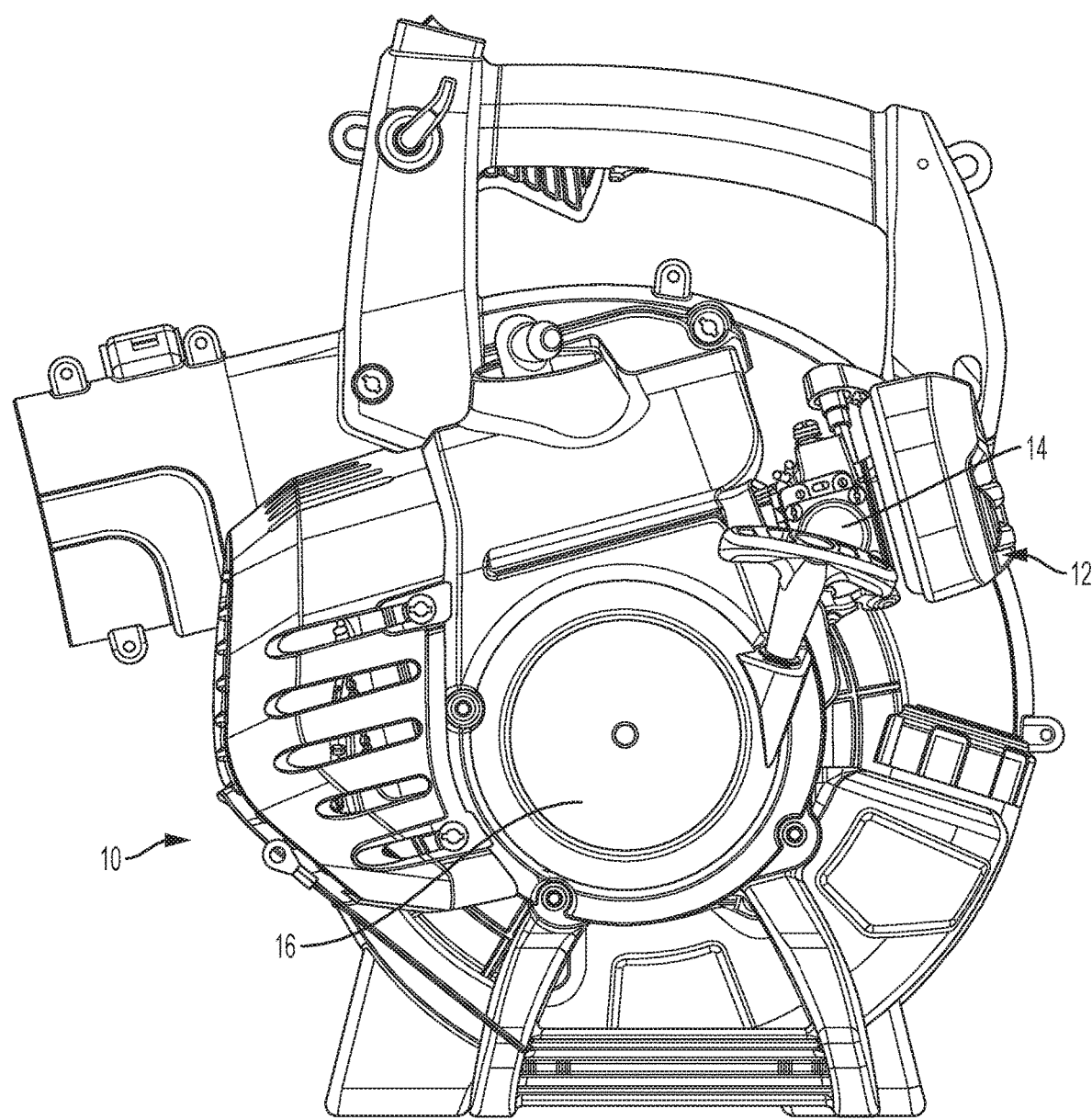
FIG. 1A is an outdoor power tool formed as a leaf blower.
Figure 1B:
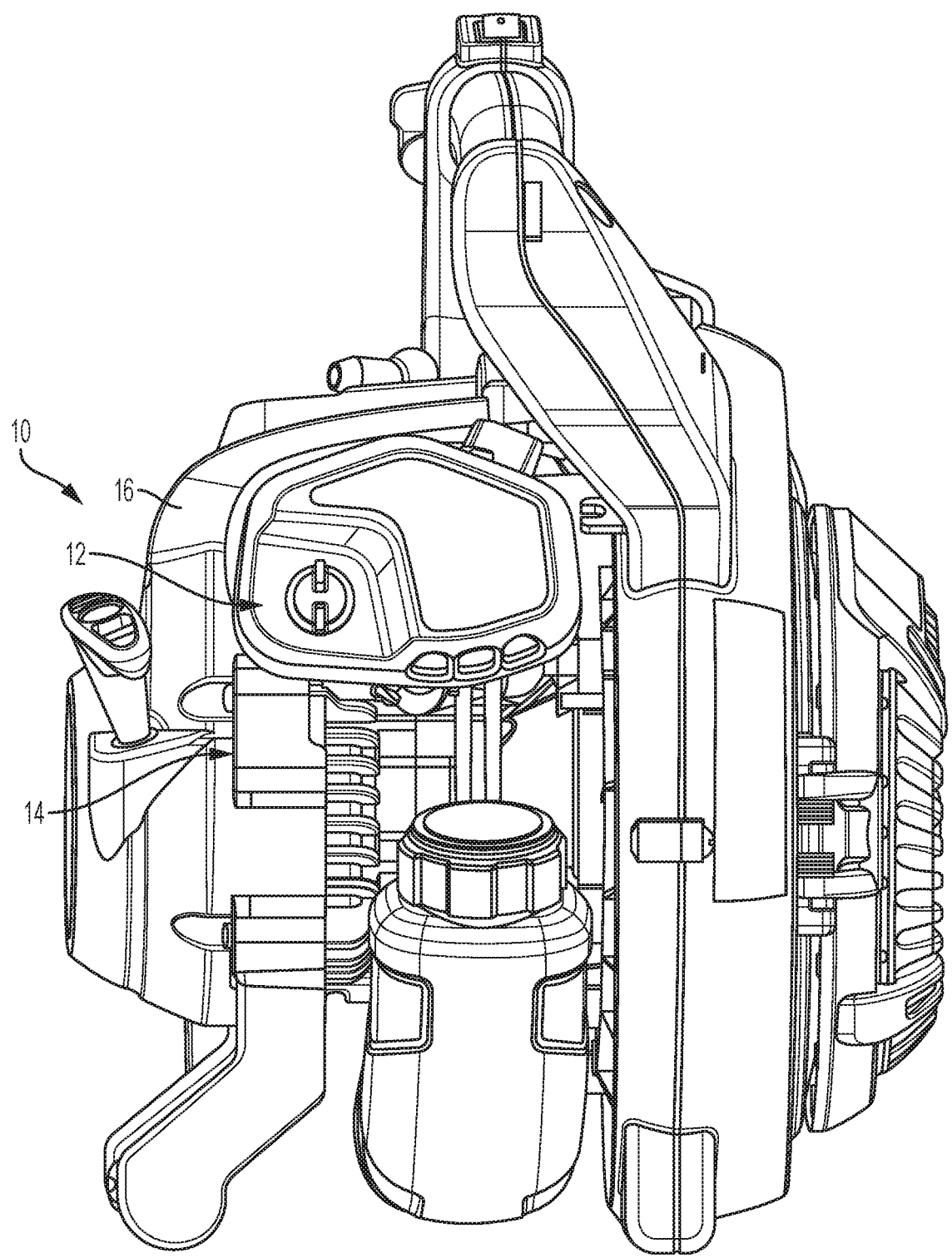
FIG. 1B shows the air box assembly of the leaf blower shown in FIG. 1A.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2A:
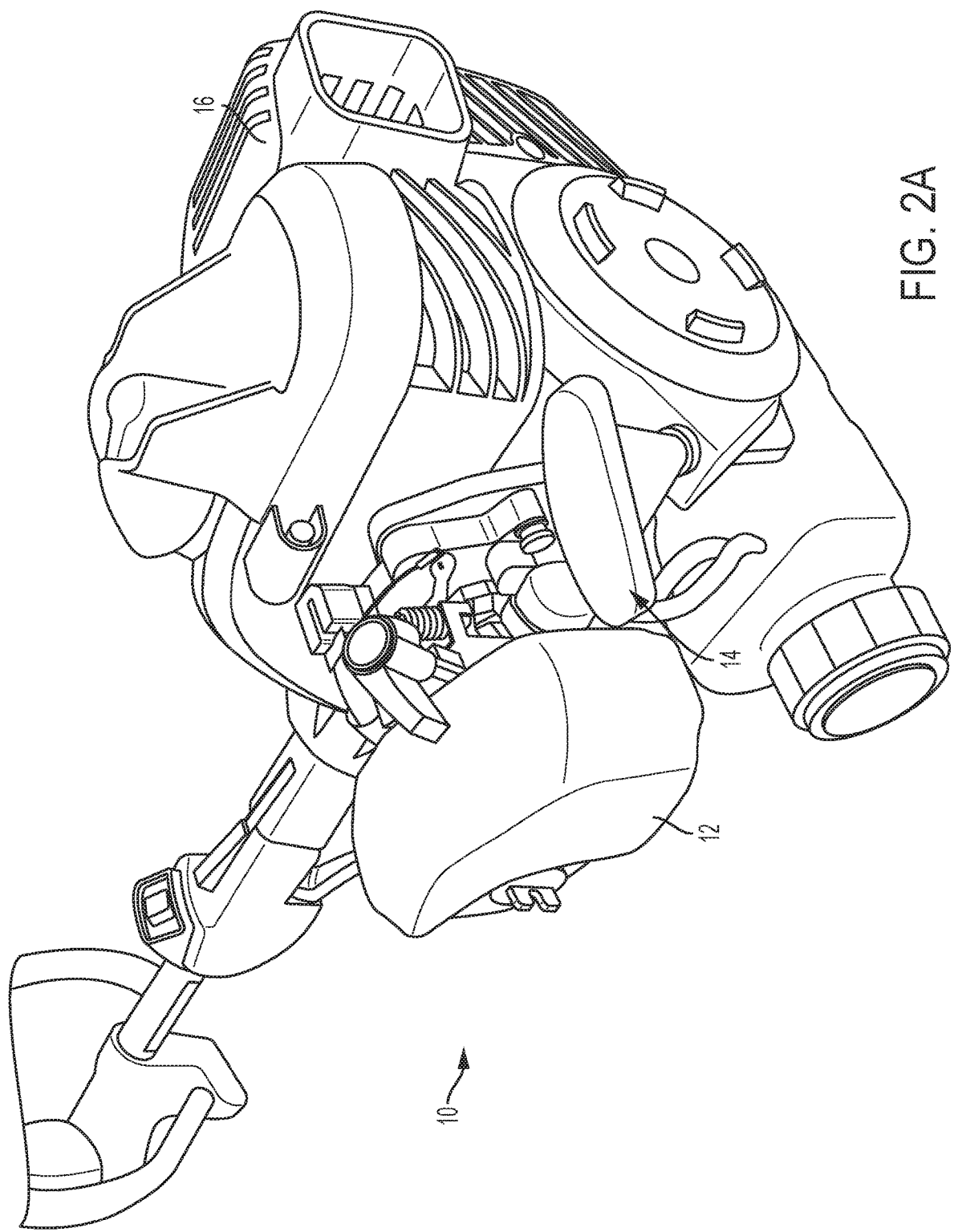
FIG. 2A is another outdoor power tool formed as a string trimmer.
Figure 2B:
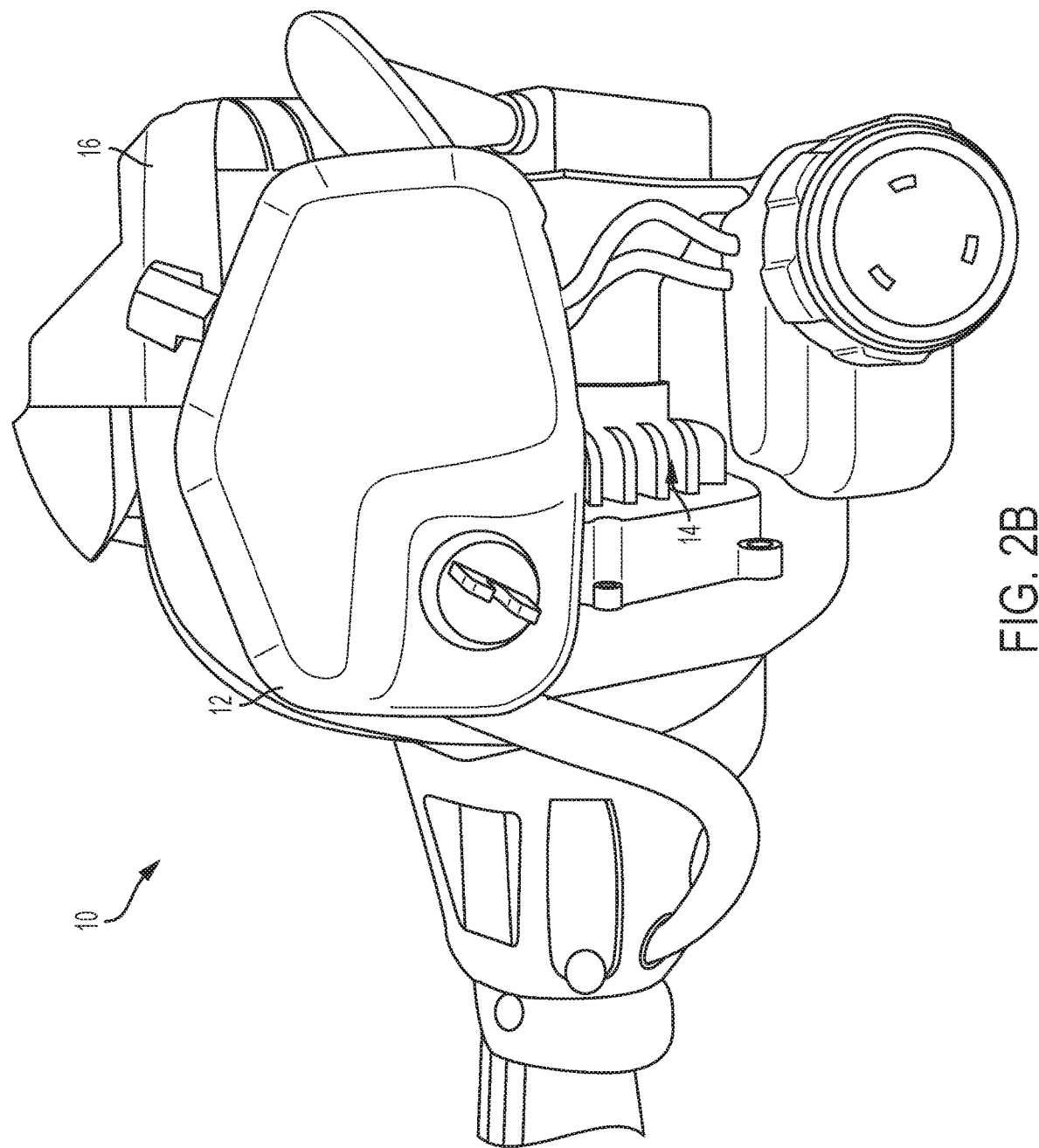
FIG. 2B shows the air box assembly of the string trimmer shown in FIG. 2A.

Referring to FIGS. 1A-2B, an exemplary embodiment of an outdoor power tool 10 having an air box assembly 12 for reducing the noise generated by the engine 14 is shown. In the illustrated embodiment, the tool 10 is shown as a handheld tool, but it should be understood by one having ordinary skill in the art that the tool can also be any other non-handheld outdoor power tool such as a riding mower, stand-on mower, walk-behind mower, backpack blower, tiller, or the like. The exemplary embodiment of the tool 10 shown in FIGS. 1A-1B is a leaf blower. The exemplary embodiment of the tool 10 shown in FIGS. 2A-2B is a string trimmer. Other embodiments of the tool 10 as a handheld tool include, but not limited to, a hedge trimmer, a chainsaw, a blower, an edger, or the like. In some embodiments, the tool 10 includes a housing 16 that at least partially surrounds and protects the engine 14. The air box assembly 12 is operatively connected to the engine 14, and provides both a media filter for filtering particles out of the ambient air as well as a sound filter for filtering sound generated by operation of the engine that travels upstream through the air box assembly 12. In an embodiment, these two types of filters are formed of separate, independent filters within the air box assembly 12. In another embodiment, these two types of filters are formed as a single, integrally formed filter, and this integrated filter may further include other types of filters/filtering materials integrally formed therewith.

The air box assembly 12 is operatively connected to the carburetor (not shown) and the engine 14, wherein the air box assembly 12 is in fluid communication with the carburetor and is configured to filter out large particles from the ambient air before the air leaves the air box assembly 12 and flows into the carburetor. The air box assembly 12 is positioned fluidly immediately upstream from the carburetor. The air box assembly 12 is also configured to reduce the amount of fuel backflow, or "spit back", in which fuel flows upstream from the combustion chamber, through the carburetor, and into the air box assembly 12.

Figure 3A:
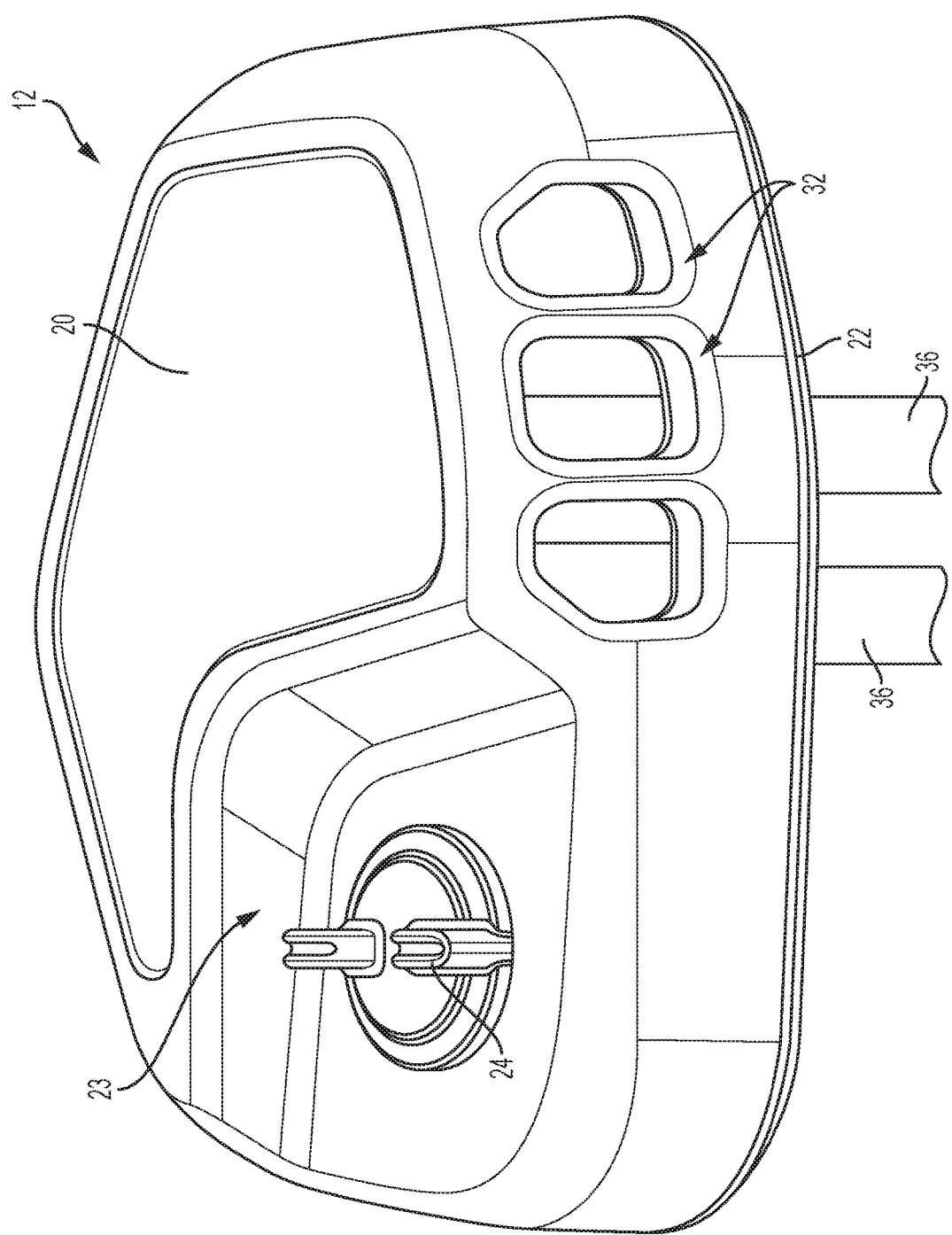
FIG. 3A is a perspective view of the air box assembly.
Figure 3B:
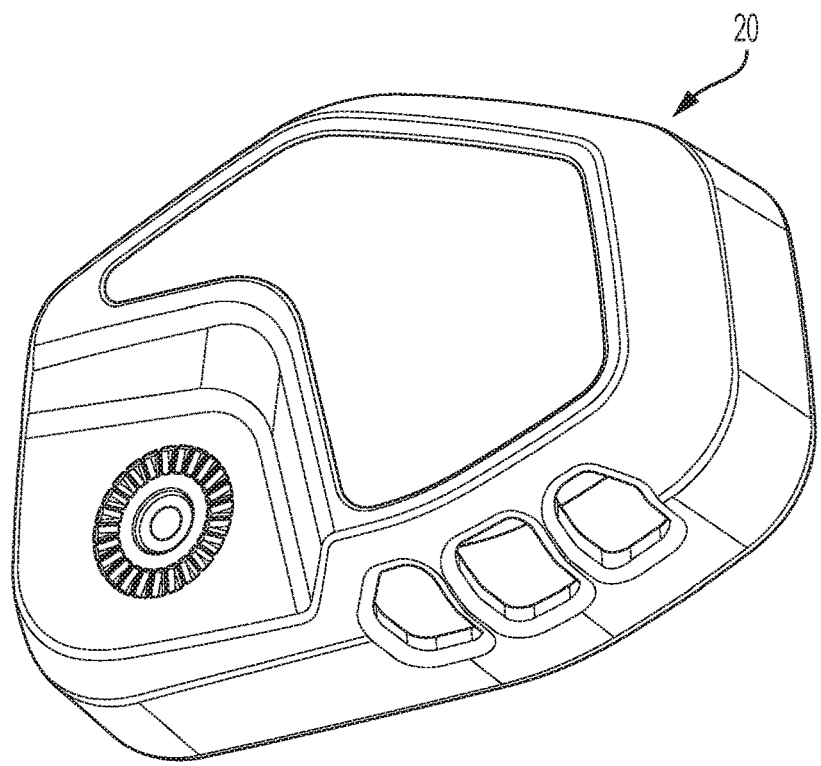
FIG. 3B is an isometric view of the upper housing.
Figure 3C:
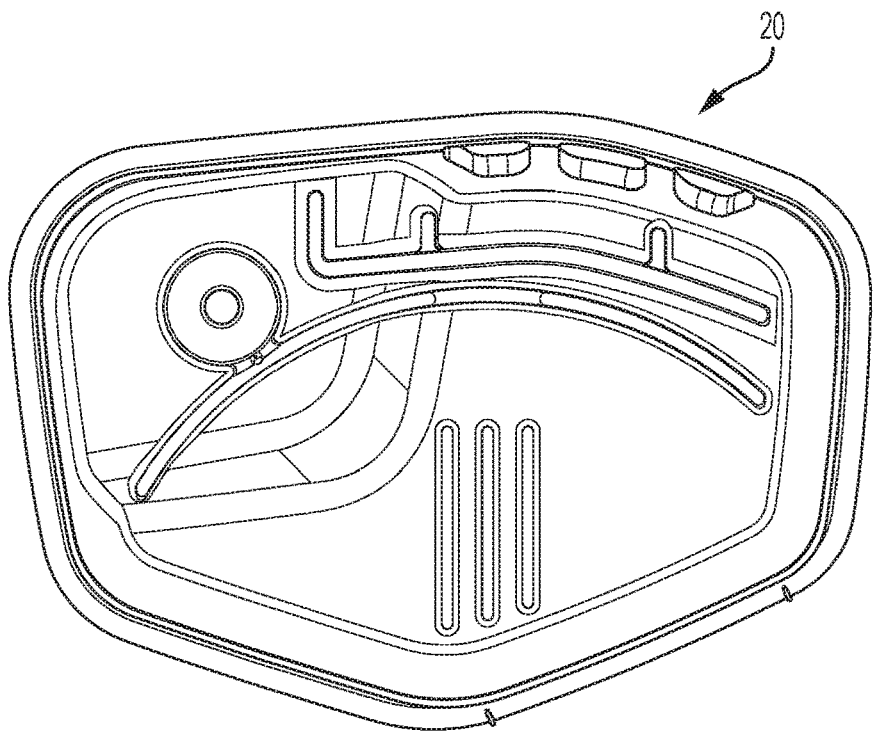
FIG. 3C is a bottom view of the upper housing of FIG. 3B.
Figure 4A:
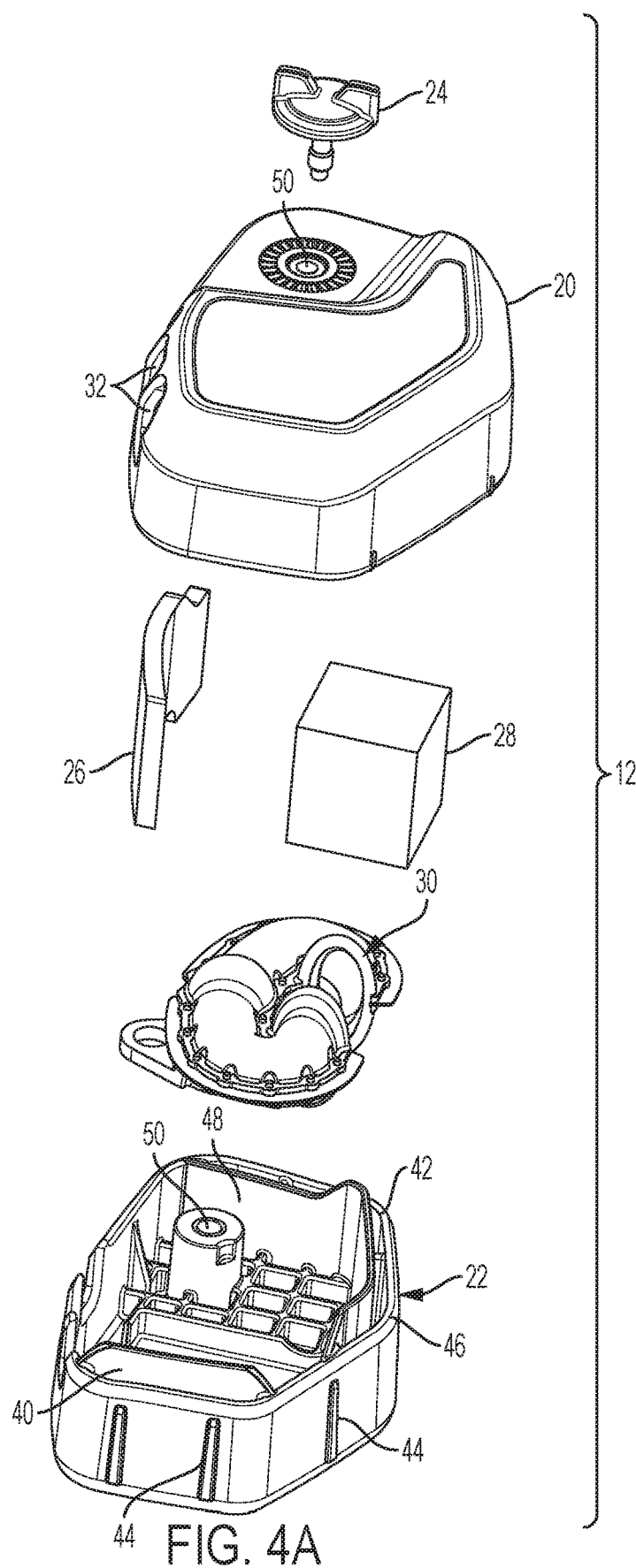
FIG. 4A is an exploded view of the air box assembly.
Figure 4B:
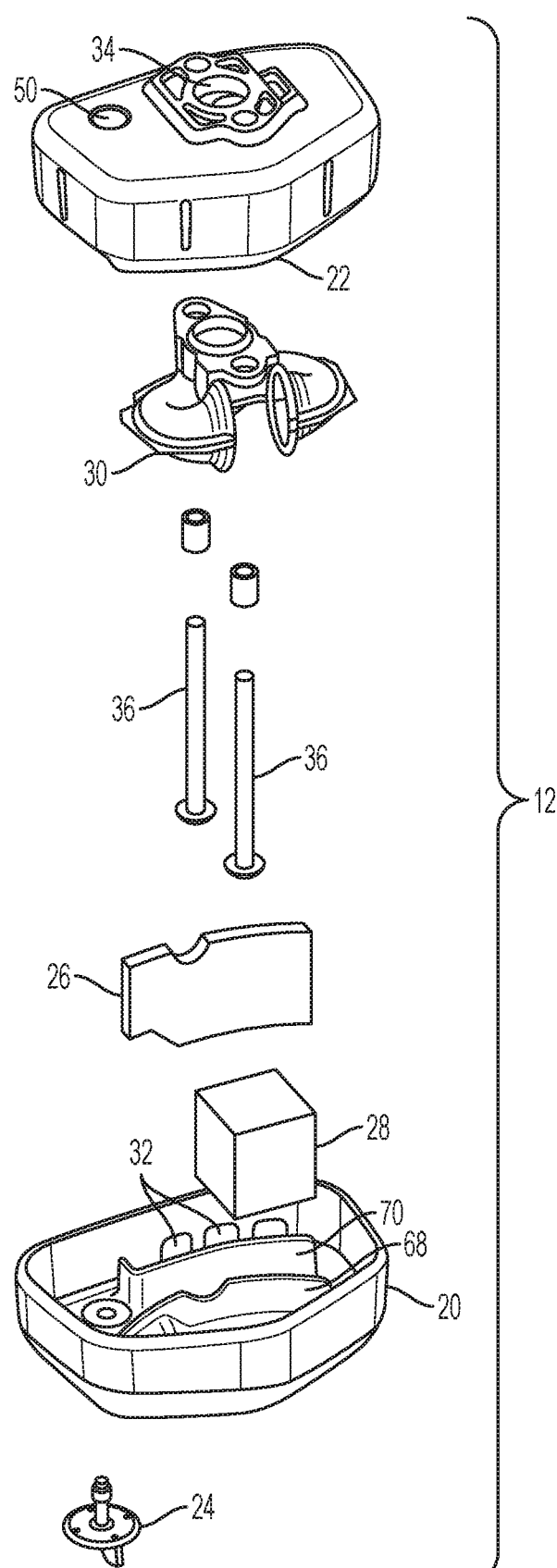
FIG. 4B is an upside-down exploded view of the air box assembly of FIG. 4A.
Figure 5A:
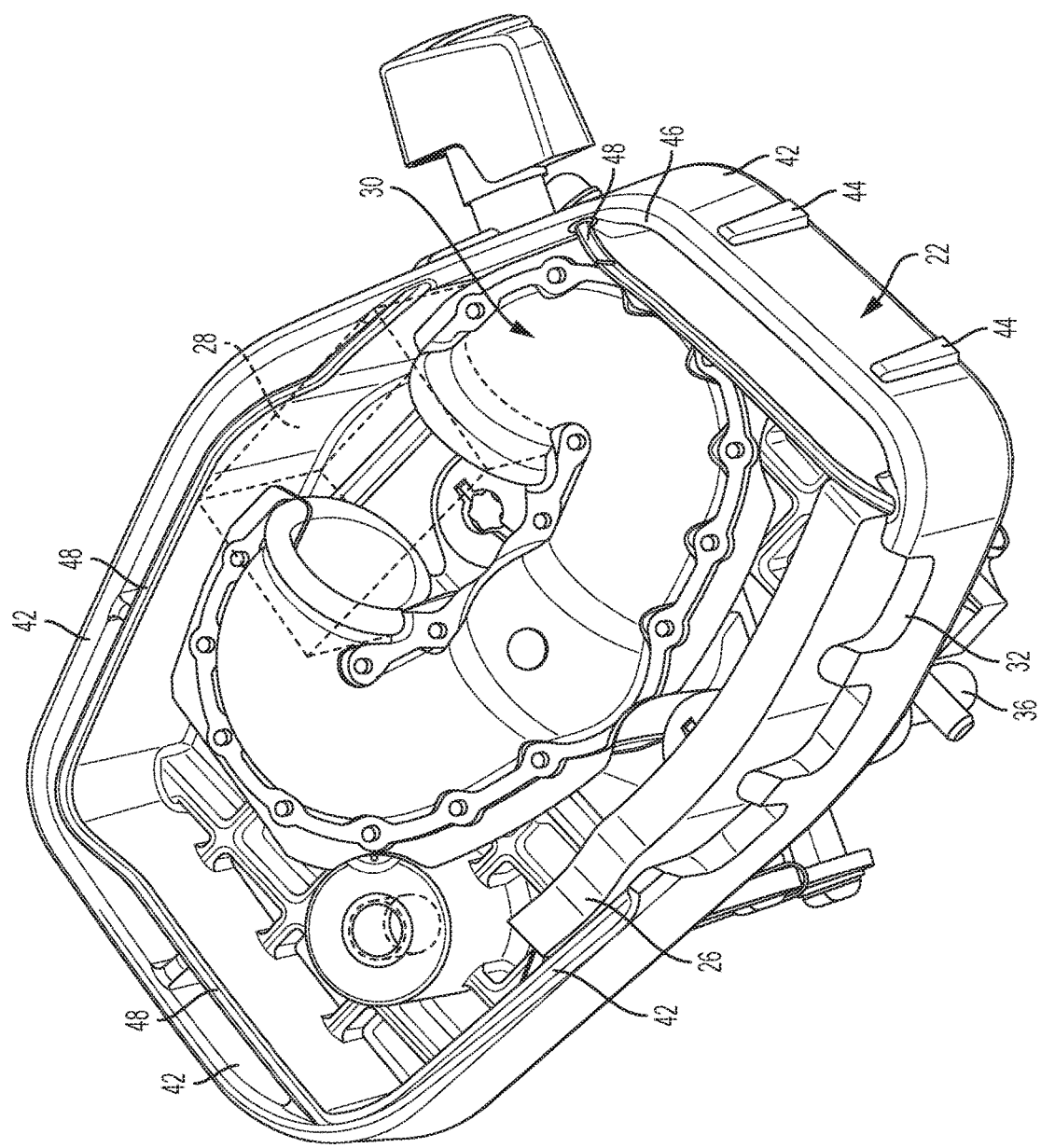
FIG. 5A is a top perspective view of the air box assembly without the upper housing.
Figure 5D:
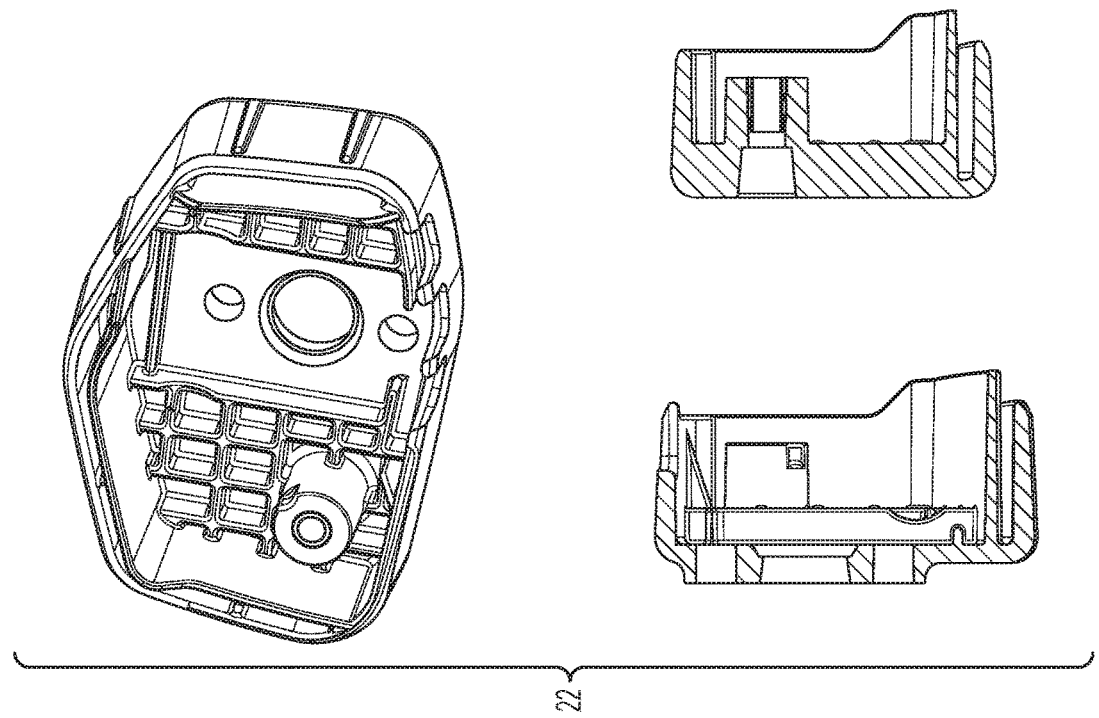
FIG. 5D is an isometric view and two cross-sectional views of the lower housing.
Figure 5C:
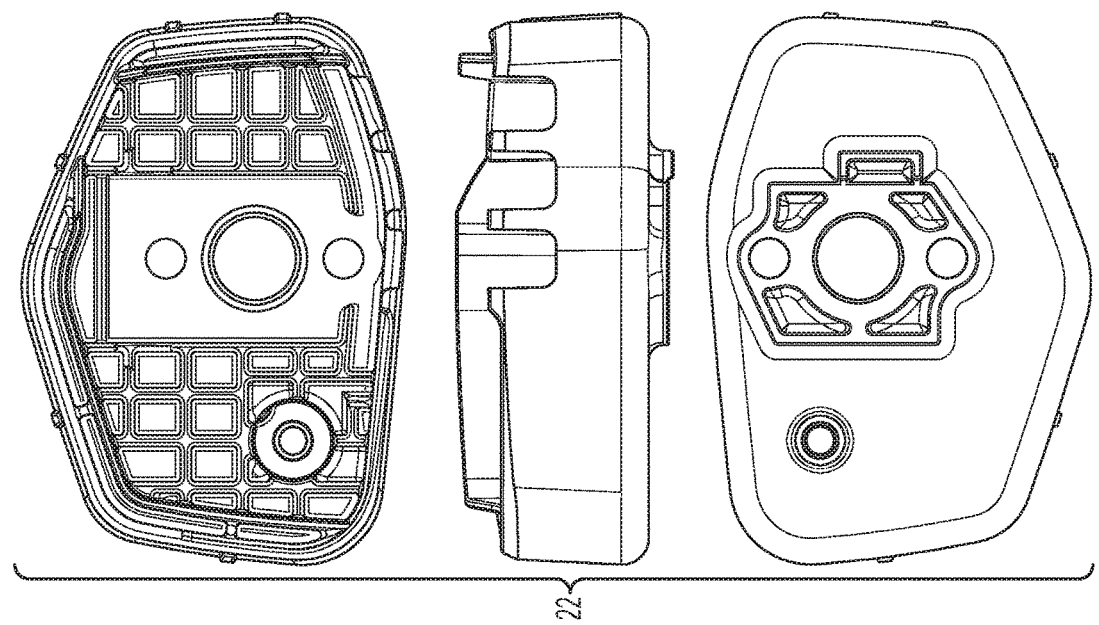
FIG. 5C is a top, a side, and a bottom view of the lower housing.

In an embodiment, the air box assembly 12 includes a casing 23 formed of an upper housing 20 and a lower housing 22, an attachment mechanism 24, two separate and distinct filters (a media filter 26 and a sound filter 28), and an air guide assembly 30, as shown in FIGS. 3 and 4A-4B. In an embodiment, the air box assembly 12 further includes a plurality of air inlets 32 through which ambient air enters the air box assembly 12 and an air outlet 34 through which air is transferred to the carburetor. As shown in FIGS. 3 and 5, the air box assembly 12 is attached to the engine 14 by way of a pair of bolts 36 that operatively connect the lower housing 22 to the engine 14.

In the exemplary embodiment illustrated in FIGS. 3 and 4A-4B, the air box assembly 12 includes a casing 23 that is formed by the upper housing 20 being removably attachable to the lower housing 22 to enclose a volume in which the air guide assembly 30, an media filter 26, and a sound filter 28 are positioned. When assembled, the upper and lower housings 20, 22 cooperate to provide at least one air inlet 32 that allows ambient air to be introduced into the air box assembly 12. The illustrated embodiment of the air box assembly 12 shown in FIG. 3 includes three (3) air inlets 32, but it should be understood by one having ordinary skill in the art that the air box assembly 12 can include any number of air inlets 32 formed therethrough. In an embodiment, the air inlets 32 are positioned on the side of the air box assembly 12, but it should be understood by one skilled in the art that the air inlets 32 can be positioned at any location on the air box assembly 12 and do not need to be positioned adjacent to each other. In some embodiments, the air inlets 32 are positioned such that during operation of the tool 12, the air inlets 32 are directed toward the ground. Directing the air inlets 32 towards the ground helps to reduce the amount of noise at the ear level of the operator. The air inlets 32 should be sized and shaped to allow a sufficient amount of air to pass therethrough for use by the engine 14. In the illustrated embodiment, at least a portion of the air inlets 32 are formed in both the upper and lower housings 20, 22. In other embodiments, the air inlets 32 are formed through only the upper housing 20, only the lower housing 22, or at least one air inlet 32 formed through the upper housing 20 and at least one air inlet 32 formed through the lower housing 22. In an embodiment, the upper and lower housings 20, 22 are formed of injection molded plastic. It should be understood by one having ordinary skill in the art that the upper and lower housings 20, 22 can be formed of any other material sufficient to withstand the temperatures generated by the engine 14.

Figure 7:
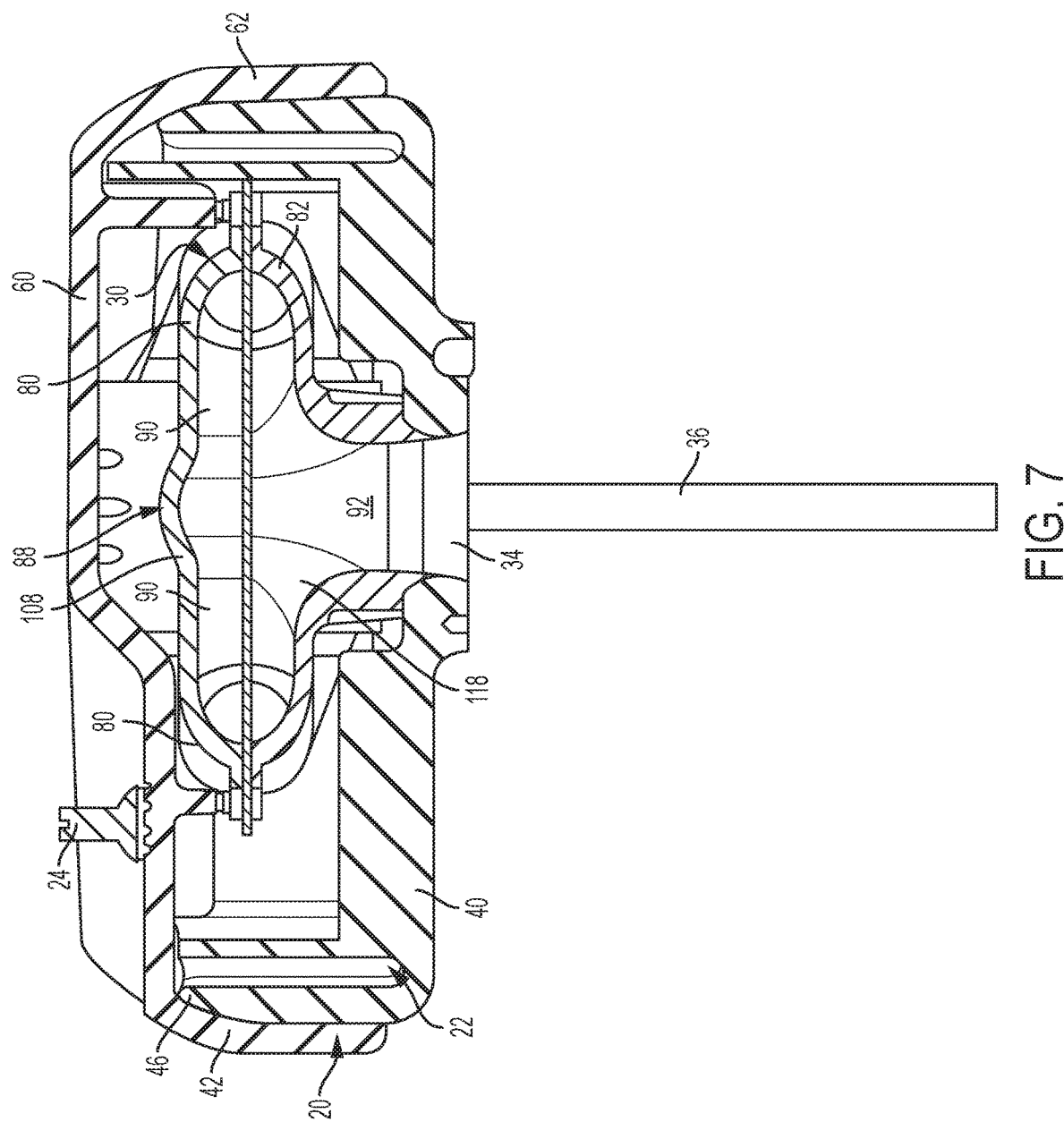
FIG. 7 is a cross-sectional view of the air box assembly taken through the air outlet thereof.

The air box assembly 12 further includes an air outlet 34, as shown in FIGS. 4B and 7. The air outlet 34 is in fluid communication with the carburetor, wherein the air that exits the air box assembly 12 flows out of the air box assembly though the air outlet 34 and is introduced into the carburetor. In the illustrated embodiment, the air outlet 34 is formed through the lower housing 22. It should be understood by one having ordinary skill in the art that the air outlet 34 can be formed at any position on the air box assembly 12 provided that at least a portion of the surface through which the air outlet 34 is formed is able to mate with a corresponding surface on the carburetor. The air outlet 34 of the air box assembly 12 is positioned immediately adjacent to the carburetor in an abutting manner to prevent any gaps or leaks between the air box assembly 12 and the carburetor.

The lower housing 22 of the air box assembly 12 is formed as a generally cup-shaped or bowl-shaped hollow member having a lower wall 40 and a side wall 42 that extends upwardly therefrom, as shown in FIGS. 4A and 5. The lower housing 22 includes a plurality of ribs 44 that extend outwardly from the outer surface of the side wall 42. The ribs 44 are spaced apart along the outer surface of the side wall 42. The ribs 44 extend upwardly from a position adjacent to the lower wall 40 along the side wall 42 toward the upper edge of the side wall 42 received by the upper housing 20. The ribs 44 are configured to provide an interference fit between the upper and lower housings 20, 22 when assembled. As shown in FIG. 7, the side wall 42 of the lower housing 22 is tapered slightly inwardly toward the enclosed volume in order to allow for proper molding during production. The corresponding side wall of the upper housing 20 is tapered slightly outward away from the enclosed volume, and the ribs 44 positioned on the outer surface of the side wall 42 of the lower housing 22 eliminates the gap between the opposing tapered walls of the side walls of the upper and lower housings 20, 22. The ribs 44 provide a positive seal between the upper and lower housings 20, 22 so that the sound from the engine 14 that travels upstream through the air box assembly 12 can only exit through the air inlets 32.

In an embodiment, the upper edge 46 of the side wall 42 of the lower housing 22 is beveled, as shown in FIG. 7. This bevel of the upper edge 46 cooperates with a similarly bevel of the transition surface between the upper wall and side wall of the upper housing 20 to provide a substantially sealed connection between the upper and lower housings 20, 22.

The lower housing 22 further includes a secondary wall 48 extending substantially parallel to a portion of the side wall 42, as shown in FIGS. 4A, 5, and 7. In the illustrated embodiment, the secondary wall 48 extends substantially parallel to at least a portion of the side wall 42 along each of the wall portions about the circumferences of the lower housing 22. In an embodiment, the secondary wall 48 is positioned adjacent to the air inlets 32 formed in the lower housing 22. The secondary wall 48 is spaced apart from the side wall 42 a distance sufficient to receive the media filter 26 therebetween. The secondary wall 48 is configured to cooperate with the side wall 42 to positively position the media filter 26 against the inner surface of the upper and lower housings 20, 22 and against the air inlets 32 so as to ensure that ambient air flowing into the air box assembly 12 flows through the media filter 26. In other embodiments, the secondary wall 48 is formed in a similar manner only on the upper housing 20. In still other embodiments, both the upper and lower housings 20, 22 include a secondary wall 48 for securing the media filter 26 adjacent to the air inlets 32. The secondary wall 48 is spaced away from the side wall 42 to provide a hollow volume therebetween, wherein the hollow volume acts as an insulator and helps to absorb sound emanating from the engine 14 through the air box assembly 12 in order to reduce the overall sound generated by the engine 14. It should be understood by one having ordinary skill in the art that the secondary wall 48 can extend adjacent to the entire inner surface of the side wall 42 of the lower housing 22, or the secondary wall 48 can extend adjacent to only a portion of the inner surface of the side wall 42 of the lower housing 22.

The media filter 26, as explained above, is positioned immediately adjacent to the inner surface of both the upper and lower housings 20, 22 in an abutting manner so as to cover the air inlets 32, as shown in FIG. 5. The media filter 26 can be any air filter or media filter sufficient to filter out large particles such as wood chips, dirt particles, grass clippings, leaves, or any other particles of sufficient size that would cause problems with the proper operation of the carburetor or engine. In the illustrated embodiment, the media filter 26 is formed as a single layer of the same material or matrix. In other embodiments, the media filter 26 can include multiple layers configured to filter out different sized particles at each layer. In another embodiment, the media filter 26 can include multiple layers, wherein at least one layer is configured to filter small particles from the ambient air entering the enclosed volume within the casing 23 and at least another layer is configured to provide sound filtering adjacent to the air inlets 32 of the casing 23.

As shown in FIGS. 3 and 4, the illustrated embodiment of the attachment mechanism 24 of the air box 12 is configured to secure the upper housing 20 to the lower housing 22. In an embodiment, the attachment mechanism 24 is formed as a thumb screw. The attachment mechanism 24 is configured to be inserted through corresponding apertures 50 formed in both the upper and lower housings 20, 22. In other embodiments, the attachment mechanism 24 can be formed as a plurality of toggle clamps located around the edges of the air box assembly 12, snap tabs and recesses, or any other mechanical fastener sufficient to positively and releasably secure the upper and lower housings 20, 22 together. The attachment mechanism 24 allows an operator to remove the upper housing 20 from the lower housing 22 in order to replace or repair the media filter 26, sound filter 28, and/or the air guide assembly 30.

As shown in FIGS. 4A-4B and 5, a sound filter 28 is positioned within the casing 23 formed by the upper and lower housings 20, 22. The sound filter 28 can be formed of any material sufficient to reduce the noise emanating from the combustion chamber(s) of the engine 14. The sound filter 28 is positioned immediately adjacent to the opposing openings 86 of the air guide assembly 30 in an abutting manner such that each of the openings 86 contacts the sound filter 28 and directs the sound from within the air guide assembly 30 into the sound filter 28. The sound filter 28 can also act as a secondary air filter for filtering particles from the air before the air enters the air guide assembly 30. In an embodiment, the sound filter 28 has a generally cubic shape, but it should be understood by one having ordinary skill in the art that the sound filter 28 can have any shape sufficient to extend between—and be positioned immediately adjacent to—the openings 86 of the air guide assembly 30. In an embodiment, the sound filter 28 is formed of a foam material having about 110 pores per inch. It should be understood by one skilled in the art that the sound filter 28 can be formed of any material and have any density sufficient to both filter particles from the air entering the air guide assembly 30—while still allowing air to flow into the air guide assembly 30—as well as aide in reducing noise from the operation of the engine 14.

In an embodiment, the upper housing 20 is formed as a generally cup-shaped or bowl-shaped hollow member having an upper wall 60 and a side wall 62 that extends downwardly therefrom, as shown in FIGS. 4B and 7. The side wall 62 of the upper housing 20 is tapered slightly outward away from the enclosed volume in order to allow for proper molding during production. The curved transition surface between the upper wall 60 and the side wall 62 includes a beveled surface that cooperates with the upper edge 46 of the side wall 42 of the lower housing 22, as explained above and shown in FIG. 7.

In the illustrated embodiment, the upper housing 20 further includes a plurality of substantially parallel ribs 66 extending inwardly from the inwardly-directed surface of the upper wall 60, as shown in FIG. 4B. The ribs 66 are oriented in a direction generally toward the air inlets 32. The ribs 66 are configured to extend downwardly from the upper wall 60, wherein the ribs 66 contact the upper surface of the sound filter 28 when the air box assembly 12 is assembled. The open space between adjacent ribs 66 allows air to flow over the top surface of the sound filter 28 while providing additional surface area through which air can flow into the sound filter 28.

In an exemplary embodiment, the upper housing 20 also includes a positioning wall 68 that extends downwardly from the inwardly-directed surface of the upper wall 60, as shown in FIG. 4B. The positioning wall 68 is aligned generally transverse relative to the ribs 66, and the positioning wall 68 is located between the ribs 66 and the air inlets 32. The positioning wall 68 includes a cut-out configured to receive a portion of the air guide assembly 30, thereby providing a barrier for both sound and air flow between the air inlets 32 and the air outlet 34. By forcing the air flow and flow of sound to be redirected by the positioning wall 68 as both travel between the air inlets 32 and the air outlet 34 (or vice-versa), the sound waves are further required to be deflected of additional surfaces within the air box assembly 12 in order to reduce the amount of noise exiting therefrom.

As shown in FIG. 4B, an embodiment of the upper housing 20 additionally includes a tertiary wall 70 that extends downwardly from the inwardly-directed surface of the upper wall 60, as shown in FIG. 4B. The tertiary wall 70 is aligned generally transverse relative to the ribs 66 and generally parallel relative to the positioning wall 68. The tertiary wall 70 is further positioned between the positioning wall 68 and the air inlets 32. The tertiary wall 70 further prevents a direct pathway for the sound to travel from the air guide assembly 30 to the air inlets 32, thereby forcing the sound waves to rebound off of the tertiary wall 70 and other walls before exiting the air box assembly 12. The secondary wall 48 and the tertiary wall 70 are positioned within the casing 23 for redirecting sound therewithin.

In an embodiment, the casing 23 formed of the upper and lower housings 20, 22 is made of a sound-reducing plastic material. However, it should be understood by one having ordinary skill in the art that the upper and lower housings 20, 22 can be formed of any material sufficient to withstand the temperatures generated by the engine 14 as well as being sufficiently rugged to withstand repeated contact with other objects during transport or operation. In an embodiment, the upper and lower housings 20, 22 are formed of the same material. In another embodiment, the upper and lower housings 20, 22 are formed of different materials. In further embodiments, the upper and/or lower housing 20, 22 can be formed of multiple materials, wherein portions of the housings may have inlays or otherwise positioning sound-reducing materials in locations that would cause a reduction in noise emitted from the air box assembly 12.

As shown in FIGS. 4A-4B and 5-7, an exemplary embodiment of an air guide assembly 30 is shown. The air guide assembly 30 is secured to the lower housing 22 by way the bolts 36 that extend through separate apertures in the air guide assembly 30 and the lower housing 22 before being received by the engine 14. In an embodiment, the air guide assembly 30 includes an upper guide housing 80, a lower guide housing 82, and a gasket 84 positioned between the upper and lower guide housings 80, 82 in a sandwiched manner. The upper and lower guide housings 80, 82 are attached together—with the gasket 84 positioned therebetween—using a heat stake connection method. The gasket 84 positioned between the upper and lower guide housings 80, 82 provides additional sound dampening by preventing or minimizing vibrations resulting from contact between the upper and lower guide housings 80, 82. The gasket 84 is formed as a flexible member that provides a sealing connection between the upper and lower guide housings 80, 82, wherein the gasket 84 fills any gaps resulting from the manufacturing process. In an exemplary embodiment, the gasket 84 positioned between the upper and lower guide housings 80, 82 reduces the noise exiting the air box assembly by about one decibel (~1 dB). However, it should be understood by one having ordinary skill in the art that the material of the gasket 84 can be optimized to maximize or otherwise customize the amount of sound reduction produced by the gasket 84. In another embodiment, the air guide assembly 30 can be assembled without the gasket 84.

Figure 6A:
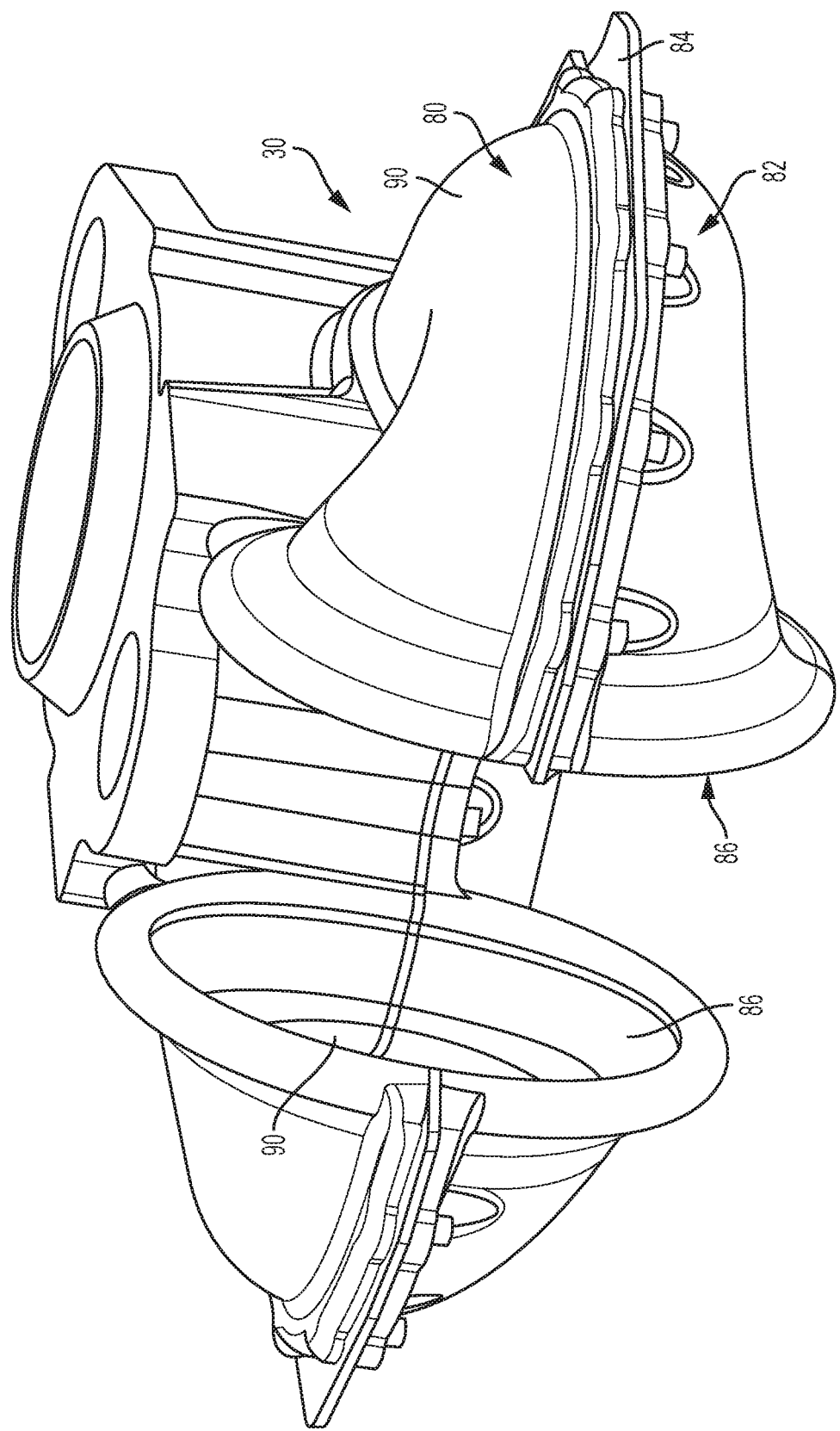
FIG. 6A is a perspective view of the air guide assembly.
Figure 6B:
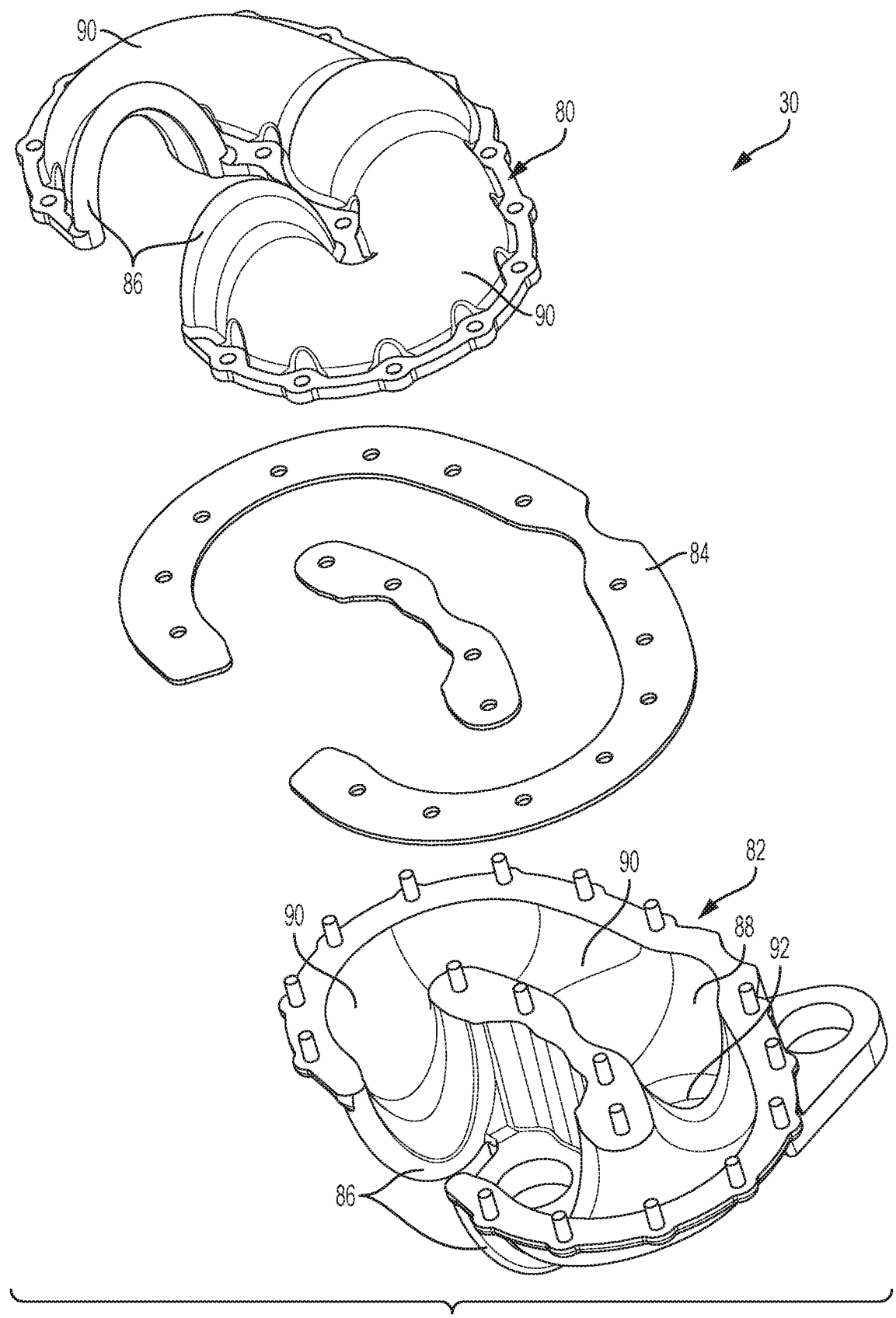
FIG. 6B is an exploded view of the air guide assembly shown in FIG. 6A.

In the illustrated embodiment, the upper and lower guide housings 80, 82 of the air guide assembly 30, as shown in FIGS. 6A-6B, form a pair of fluid pathways having a generally oval shape with a truncated portion/section in which a section of the upper and lower guide housings 80, 82 is missing. The sound filter 28 is positioned within this truncated section and extends between the openings 86 of the fluid pathways 90. In another embodiment, the air guide assembly 30 has a generally circular shape. It should be understood by one having ordinary skill in the art that the upper and lower guide housings 80, 82 can be formed of any shape so long as the tubular passageway generated by the upper and lower guide housings 80, 82 provide a plurality of pathways through which sound generated by the engine 14 can travel as well as each pathway through which the sound travelling therewithin is directed toward another of the pathways. Each of the upper and lower guide housings 80, 82 includes an arcuate section between the opening 86 and the exit aperture 92, wherein each pathway 90 curves away from the opening 86 thereto. The arcuate section of each pathway 90 increases the length of the pathway 90 between the opening 86 and the exit aperture 92, wherein the increased pathway length as well as the arcuate shape increases sound deflections within the pathway 90 which aids in reducing the level of sound emitted from the air box assembly 12. In a further embodiment, the upper and lower guide housings 80, 82 form a completely enclosed passageway having only apertures formed through the walls of the upper and/or lower guide housings 80, 82 to allow air flow to enter.

In an embodiment, the upper guide housing 80 cooperates with the lower guide housing 82 to form a tubular air guide assembly 30, wherein the upper and lower guide housings 80, 82 provide alternative hollow fluid pathways 90 through which air and sound can travel through the air guide assembly 12, as shown in FIGS. 6A-6E. The fluid pathways 90 increase the distance along which sound must travel between the air outlet 34 of the air box assembly 12 and the air inlets 32 thereof. Increasing the distance the sound must travel to exit the air box assembly 12 also increases the surface area against which the sound deflects and creates interference of the sound waves to decrease the amount of sound that eventually exits the air box assembly 12. The air guide assembly 12 includes a pair of opposing openings 86 through which air enters the air guide assembly 12 after passing through the sound filter 28 (FIG. 5) and an exit aperture 92 through which the air exits the air guide assembly 30 prior to exiting the air box assembly 12 through the air outlet 34. Thus, the exit aperture 92 of the air guide assembly 30 is positioned immediately adjacent to and in direct flow communication with the air outlet 34 of the air box assembly 12. The opposing openings 86 also allow the noise or sound from the operation of the engine 14 to travel through the passageways defined by the upper and lower housings 80, 82 to exit the air guide assembly 30. In an embodiment, the openings 86 of the fluid pathways 90 are oriented such that the openings 86 are directed directly at each other. In the illustrated embodiment, the openings 86 of the fluid pathways 90 are directed toward each other at an angle, shown as a in FIG. 6D, such that the sound waves exiting the openings 86 contact each other at an angle within the sound filter 28. For example, the angle α at which the openings 86 of the opposing fluid pathways 90 of are oriented is about one hundred seventy degrees (~170°) therebetween. The angle α of orientation of the openings 86 can be between about thirty degrees (~30°) and one hundred eighty degrees (~180°—wherein the openings 86 are directed directly toward each other) relative to each other. It should be understood by one having ordinary skill in the art that the collision of the sound waves travelling though the opposing fluid pathways 90 should be directed by the openings 86 such that the sound waves collide with each other within the sound filter 28 positioned between the openings 86.

In an embodiment, the openings 86 of the air guide assembly 30 are configured to allow air flowing toward the engine 14 to enter the air guide assembly 12 as well as allow the sound emanating from the engine 14 travelling upstream to exit the air guide assembly 12. In the embodiment shown in FIGS. 6A-6B, 6D, and 7, the air guide assembly 30 includes a cupping portion 88 positioned immediately upstream relative to the exit aperture 92. The fluid pathways 90 extend in opposing directions from the cupping portion 88. The cupping portion 88 forms a portion of each of the fluid pathways 90 and fluidly connects each of the fluid pathways to the exit aperture 92.

During operation of the engine 14, there is often a certain amount of fuel backflow—or "spitback"—in which non-combusted fuel travels upstream through the carburetor and into the air box assembly 12. With extended operation, this non-combusted fool tends to pool within the air box assembly 12 or even leak therefrom. The cupping portion 88 is configured as a bulbous formation having a larger cross-sectional area relative to the cross-sectional area of the fluid pathways 90 that extend therefrom. The cupping portion 88 is configured to provide a localized, increased volume immediately upstream from the carburetor within the air guide assembly 30 in which the fuel backflow is able to accumulate. Because the fuel backflow accumulates in the cupping portion 88 of the air guide assembly 30, the non-combustion fuel remains in the cupping portion 88 and often re-flows through the carburetor and is subsequently re-introduced into the combustion chamber of the engine 14.

Figure 6C:
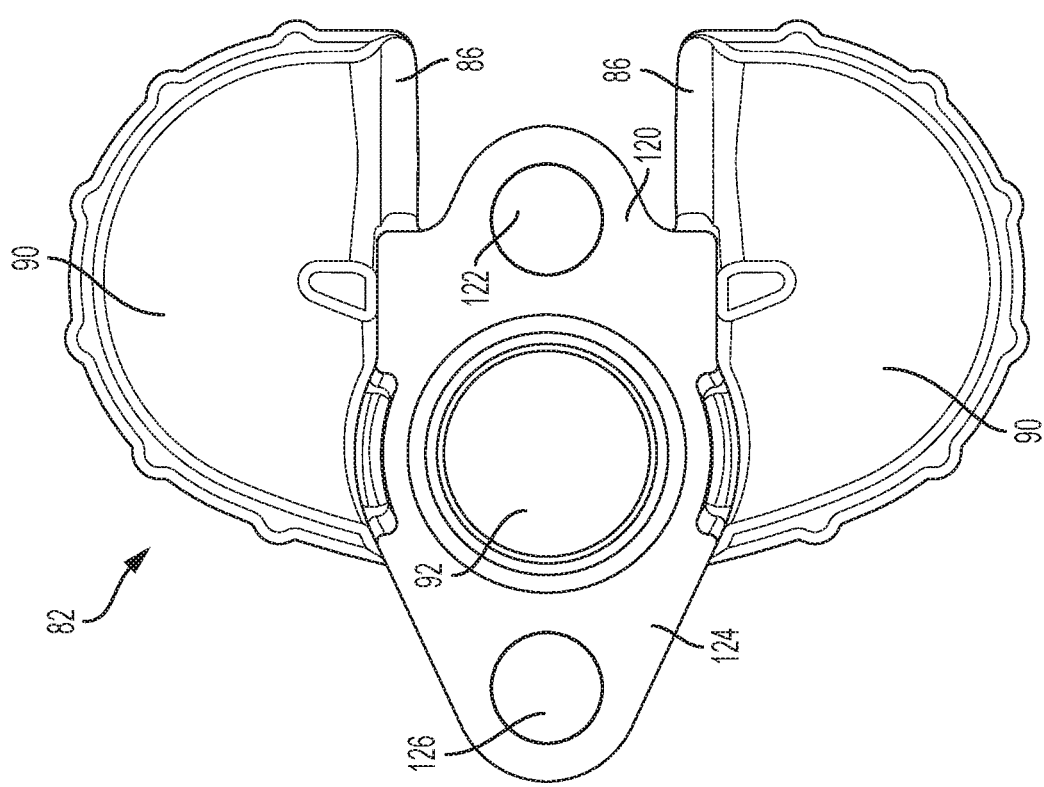
FIG. 6C is a top and bottom view of the lower guide housing of the air guide assembly.
Figure 6C:
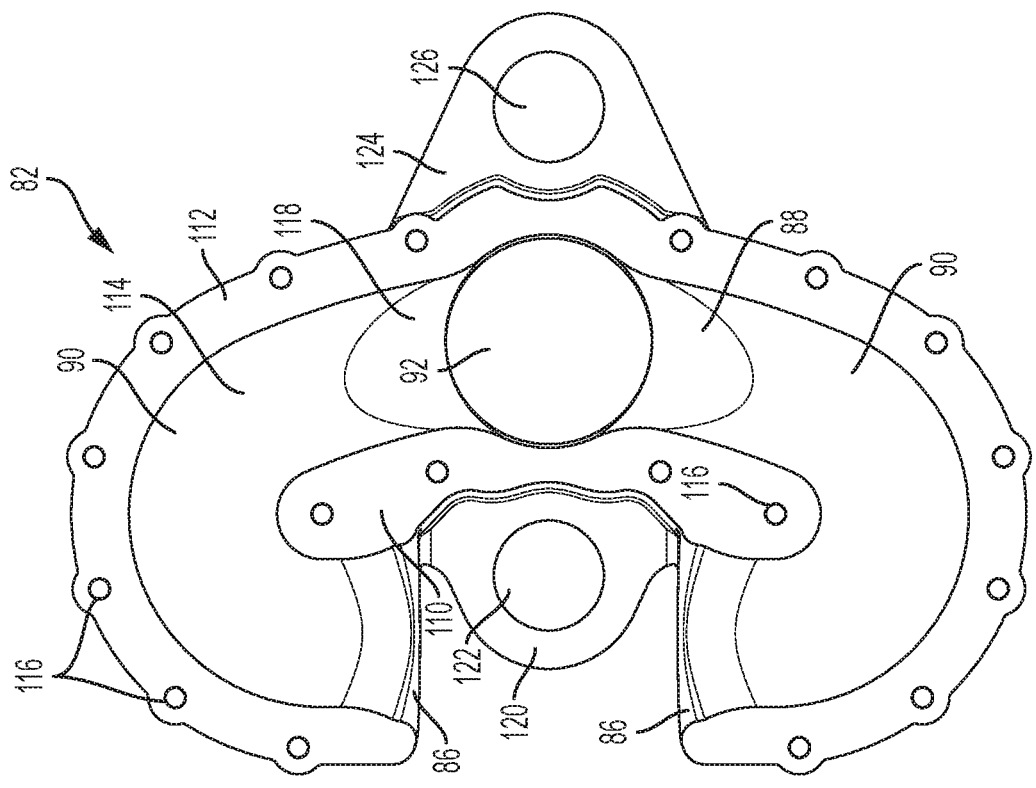
Figure 6D:
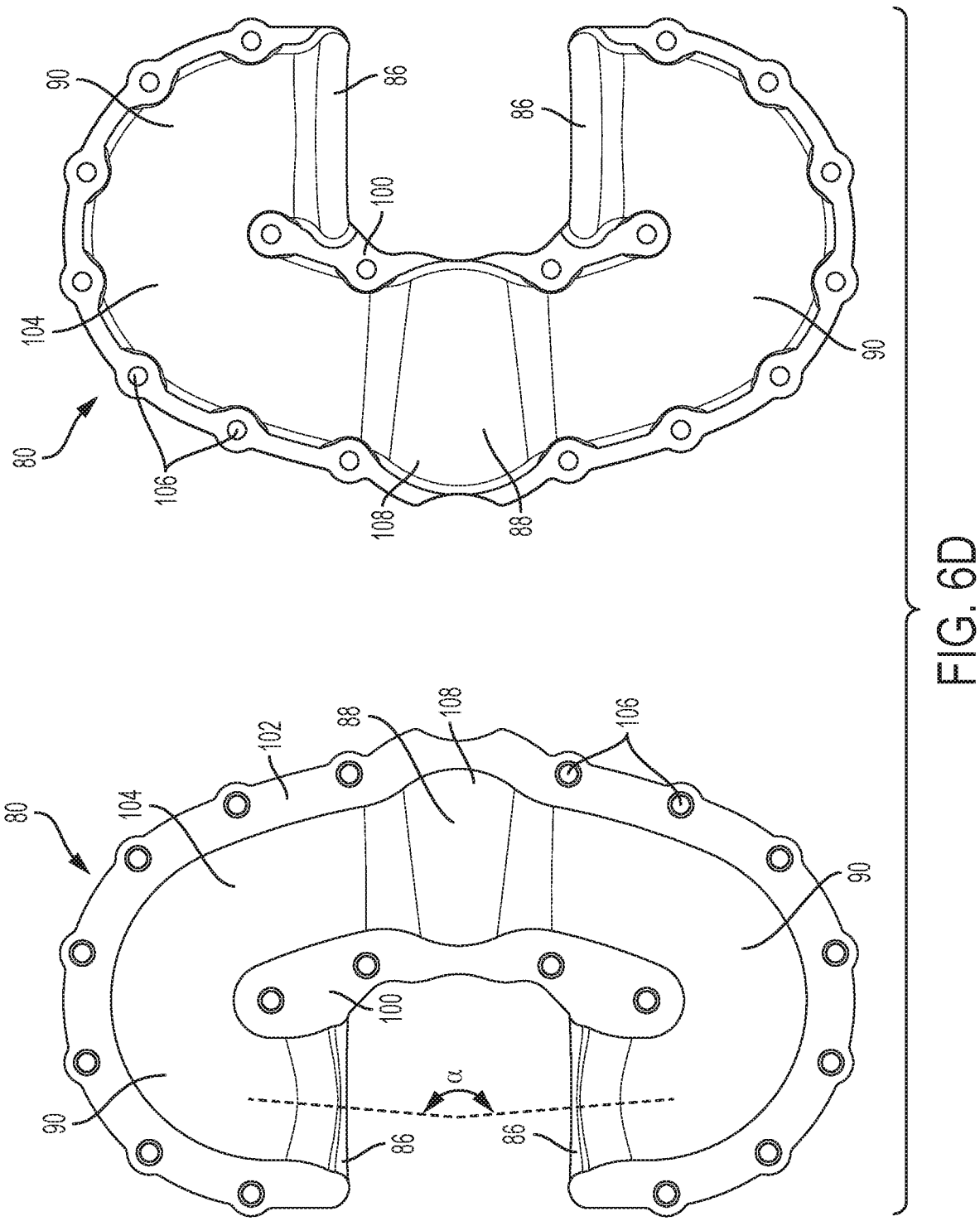
FIG. 6D is a top and bottom view of the upper guide housing of the air guide assembly.

An exemplary embodiment of the upper guide housing 80 is shown in FIGS. 6B and 6D. The upper guide housing 80 includes an inner attachment wall 100, an outer attachment wall 102, and a curved upper wall 104 extending between the inner and outer attachment walls 100, 102. The upper guide housing 80 is generally C-shaped, or substantially oval-shaped with a section along one of the elongated side edges removed. The inner and outer attachment walls 100, 102 are substantially planar walls that are aligned in a generally concentric manner, wherein the outer attachment wall 102 extends around most of the inner attachment wall 100. The inner attachment wall 100 is substantially flat, elongated member having a slight curvature to form the inner curvature of the C-shape. Each of the inner and outer attachment walls 100, 102 include a plurality of apertures 106 formed therethrough, wherein the apertures 106 allow for a heat stake attachment with the lower guide housing 82. In the illustrated embodiment, the outer attachment wall 100 is generally C-shaped or nearly oval-shaped while having a gap along one of the elongated sides of the oval. The outer attachment wall 100 extends around the inner attachment wall 102 in a surrounding manner. The curved upper wall 104 extends between the inner and outer attachment walls 100, 102 in a substantially semi-circular manner, thereby providing the upper half or upper portion of the fluid pathways 90 defined within the upper wall 104. The upper portion of the openings 86 of the air guide assembly 30 are defined by the opposing ends of the outer attachment wall 102 and the exposed edge of the curved upper wall 104 extending between the outer attachment wall 102 and the inner attachment wall 100. The upper guide housing 80 further includes an enlarged upper wall portion 108 that is located diametrically opposite the openings 86. The enlarged upper wall portion 108 has an increased diameter between the inner and outer attachment walls 100, 102, wherein the portion of the outer attachment wall 102 connected to the enlarged upper wall portion 108 is rounded. The enlarged upper wall portion 108 defines the upper half of the cupping portion 88 of the air guide assembly 30. The curved upper wall 104 that defines the upper portion of both fluid pathways 90 extend in opposing directions away from the enlarged upper wall portion 108.

The embodiment of the lower guide housing 82 shown in FIGS. 6B-6C includes an inner attachment wall 110, an outer attachment wall 112, and a lower curved wall 114 extending between the inner and outer attachment walls 110, 112. Similar to the upper guide housing 80, the lower guide housing 82 has a general C-shape, wherein the outer attachment wall 112 surrounds the inner attachment wall 110. The outer attachment wall 112 of the lower guide housing 82 is shaped the same as the outer attachment wall 102 of the upper guide housing 80 such that when the upper and lower guide housings 80, 82 are attached together, the outer attachment walls 102, 112 form mating surfaces. In the same manner, inner attachment wall 110 of the lower guide housing 82 is shaped the same as the inner attachment wall 100 of the upper guide housing 80 such that when the upper and lower guide housings 80, 82 are attached together, the inner attachment walls 100, 110 form mating surfaces. Each of the inner and outer attachment walls 110, 112 of the lower guide housing 82 includes a plurality of apertures 116, wherein the apertures 116 of the lower guide housing 82 alignable with the corresponding apertures 106 of the upper guide housing 80.

In an embodiment, the lower portion of the openings 86 of the air guide assembly 30 are defined by the opposing ends of the outer attachment wall 112 and the exposed edge of the curved lower wall 114 extending between the outer attachment wall 112 and the inner attachment wall 110 of the lower guide housing 82, as shown in FIGS. 6B-6C. The lower guide housing 82 further includes an enlarged lower wall portion 118 that is located diametrically opposite the openings 86. The enlarged lower wall portion 118 has an increased diameter between the inner and outer attachment walls 110, 112, and the enlarged lower wall portion 118 surrounds the exit aperture 92, as shown in FIG. 7. The enlarged lower wall portion 118 defines the lower half of the cupping portion 88 of the air guide assembly 30. The curved lower wall 114 that defines the lower portion of both fluid pathways 90 extend in opposing directions away from the enlarged lower wall portion 118. The lower guide housing 82 further includes a first boss 120 extending from the exit aperture 92 toward the openings 86, wherein a first connecting aperture 122 is formed through the first boss 120. A second boss 124 extends from the exit aperture 92 in the direction opposite the first boss 120, wherein a second connecting aperture 126 is formed through the second boss 124. The bolts 36 extend through the first and second bosses 120, 124 and through corresponding apertures in the lower housing 22 to attach the air guide assembly 30 to the casing 23 of the air box assembly 12 and the entire air box assembly 12 to the engine 14.

Figure 6E:
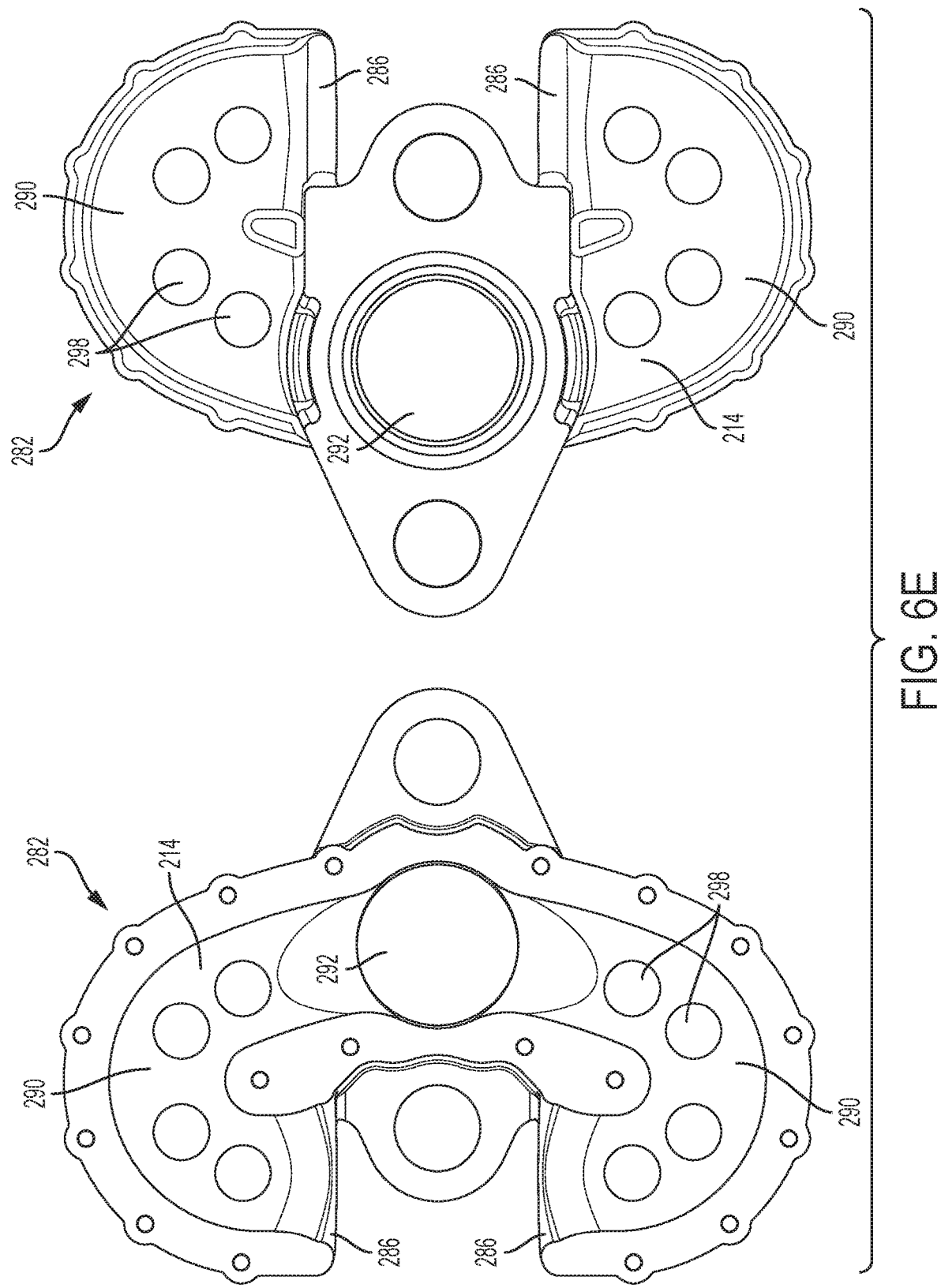
FIG. 6E is a top and bottom view of another embodiment of the lower guide housing of the air guide assembly.

FIG. 6E illustrates another embodiment of the lower guide housing 182, wherein the lower curved wall 214 includes a plurality of air apertures 298 formed therethrough. The air apertures 298 provide additional openings into the fluid pathways 290 in order to increase the amount of air that can pass through the air box assembly 12 to the engine 14. Although these air apertures 298 do not provide a noticeable reduction in sound mitigation for the air box assembly 12, the additional air that can pass through the air guide assembly 30 due to the additional air apertures 298 increases the power that can be generated by the engine 14. In other embodiments (not shown), wherein the fluid pathways 90 form a complete, sealed circuit from the cupping portion 88, the air apertures 298 provide the only air inlets into the air guide assembly 30 and the size and shape of these air apertures 298 can be optimized to provide the desired maximum air flow to the engine 14.

During operation of the engine 14, when the air box assembly 12 is assembled, ambient air flows into the enclosed space defined between the upper and lower housings 20, 22 through the air inlet(s) 32. As the ambient air passes through the air inlets 32 into the enclosed space, the ambient air passes through the media filter 26 to filter out particles contained in the air. The air then flows through the enclosed space toward the openings 86 of the air guide assembly 86. The air flows through the sound filter 28 before entering the openings 86 of the air guide assembly 86. The air splits and enters one of the opposing openings and flows into the corresponding fluid pathway 90 defined by the upper and lower guide housings 80, 82 until the air flow in both fluid pathways 90 re-combines within the cupping portion 88. Once the air from the fluid pathways 90 mixes within the cupping portion 88, the air flows through the exit aperture 92 of the air guide assembly 30 and then through the air outlet 34 of the air box assembly 12 into the carburetor (not shown).

Simultaneously during operation of the engine 14, the engine produces noise or sound that travels away from the combustion chamber and through the carburetor. The sound waves enter the air box assembly 12 by way of the air outlet 34 thereof. The sound waves then enters the air guide assembly 30 through the exit aperture 92 and into the cupping portion 88. The sound waves then split and travel through the opposing fluid pathways 90 away from the cupping portion 88. The sound waves then exit the air guide assembly 30 through the openings 86 thereof, wherein the sound waves are directed toward each other within the sound filter 28. After exiting the sound filter 28, the sound waves then travel within the enclosed space, reflecting off the walls of the casing 23, including the tertiary wall 70, the secondary wall 48, and the positioning wall 68 until the sound waves finally exit the air box assembly 12 through the air inlets 32.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. An air box assembly attached to an engine of an outdoor power tool, wherein said power tool includes a carburetor for providing an air-fuel mixture to the engine, said air box assembly being positioned immediately upstream from the carburetor, said air box assembly comprising:
   a casing formed of an upper housing and a lower housing connected to each other, said casing having at least one air inlet and an air outlet formed therein;
   at least one filter positioned within said casing; and
   an air guide assembly positioned within said casing and attached to one of said upper or lower housings, said air guide assembly having a pair of opposing openings, an exit aperture, and a plurality of fluid pathways connecting said openings and said exit aperture, wherein said exit aperture is fluidly connected to said air outlet of said casing;
   wherein ambient air enters said casing through said at least one air inlet and travels through said openings and flows through said fluid pathways of said air guide assembly, said air exits said air guide assembly through said exit aperture before exiting said casing through said air outlet; and
   wherein said air guide assembly further includes a cupping portion located immediately adjacent to said exit aperture, said opposing fluid pathways extend from said cupping portion to said corresponding opening.

2. The air box assembly of claim 1, wherein said openings of said fluid pathways are directed toward each other at an angle therebetween.

3. The air box assembly of claim 2, wherein said at least one filter includes a sound filter, said sound filter being positioned immediately adjacent to each of said openings of said air guide assembly.

4. The air box assembly of claim 1, wherein said at least one filter includes a media filter that is positioned within said casing and immediately adjacent to said at least one air inlet.

5. The air box assembly of claim 4, wherein said at least one filter further includes a sound filter positioned immediately adjacent to and extending between said openings of said air guide assembly.

6. The air box assembly of claim 1, wherein said cupping portion has a larger cross-sectional area relative to a cross-sectional area of either of said fluid pathways.

7. The air box assembly of claim 1, wherein said air guide assembly is C-shaped, wherein said openings are directed toward each other at an angle therebetween.

8. The air box assembly of claim 7, wherein said angle is between about 30°-180°.

9. An air box assembly attached to an engine of an outdoor power tool, wherein said power tool includes a carburetor for providing an air-fuel mixture to the engine, said air box assembly being positioned upstream from the carburetor, said air box assembly comprising:
   a casing formed of an upper housing and a lower housing connected to each other, said casing having at least one air inlet and an air outlet formed therein;
   a media filter positioned adjacent to said at least one air inlet;
   a sound filter positioned adjacent to said outlet; and
   an air guide assembly positioned within said casing and attached to one of said upper or lower housings, said air guide assembly having a pair of opposing openings, an exit aperture, and a pair of opposing fluid pathways, wherein each fluid pathway extends between one of said openings and said exit aperture, and said exit aperture is fluidly connected to said air outlet of said casing;
   wherein ambient air enters said casing through said at least one air inlet and travels through said openings and flows through said fluid pathways of said air guide assembly, said air exits said air guide assembly through said exit aperture before exiting said casing through said air outlet; and
   wherein said air guide assembly further includes a cupping portion located immediately adjacent to said exit aperture, said opposing fluid pathways extend from said cupping portion to said corresponding opening.

10. The air box assembly of claim 9, wherein said opposing openings are directed toward each other at an angle.

11. The air box assembly of claim 10, wherein said angle is between about 30° and 180°.

12. The air box assembly of claim 9, wherein said sound filter is positioned between said pair of openings of said air guide assembly.

13. The air box assembly of claim 9, wherein each of said fluid pathways includes an arcuate section between said opening and said exit aperture.

14. The air box assembly of claim 9, wherein said air guide assembly is formed of an upper guide housing and a lower guide housing.

15. The air box assembly of claim 14, wherein a gasket is located between said upper and lower guide housings.

16. An air box assembly attached to an engine of an outdoor power tool, wherein said power tool includes a carburetor for providing an air-fuel mixture to the engine, said air box assembly being positioned upstream from the carburetor, said air box assembly comprising:
    a casing formed of an upper housing and a lower housing connected to each other, said casing having at least one air inlet and an air outlet formed therein;
    a media filter positioned adjacent to said at least one air inlet;
    a sound filter positioned adjacent to said outlet; and
    an air guide assembly positioned within said casing and attached to one of said upper or lower housings, said air guide assembly having a pair of opposing openings, an exit aperture, and a pair of opposing fluid pathways, wherein each fluid pathway extends between one of said openings and said exit aperture, and said exit aperture is fluidly connected to said air outlet of said casing;
    wherein ambient air enters said casing through said at least one air inlet and travels through said openings and flows through said fluid pathways of said air guide assembly, said air exits said air guide assembly through said exit aperture before exiting said casing through said air outlet; and
    wherein said air guide assembly further includes a cupping portion located immediately adjacent to said exit aperture, said opposing fluid pathways extend from said cupping portion to said corresponding opening;
    wherein said cupping portion has a larger cross-sectional area relative to a cross-sectional area of either of said fluid pathways.

17. The air box assembly of claim 9 or 16, wherein a plurality of walls are positioned within said casing for redirecting sound within said casing.

* * * * *